May 31, 1938.   W. WURM   2,119,375

PHOTOGRAPHIC FILM CAMERA

Filed March 18, 1936

Wilhelm Wurm
INVENTOR

BY
Ivan E. A. Konigsberg
ATTORNEY

Patented May 31, 1938

2,119,375

UNITED STATES PATENT OFFICE 2,119,375

PHOTOGRAPHIC FILM CAMERA

Wilhelm Wurm, Stuttgart, Germany, assignor to Ernst Leitz, G. m. b. H., Wetzlar, Germany Application March 18, 1936, Serial No. 69,498

3 Claims. (Cl. 88—18.4)

This invention relates to moving picture cameras and film casettes of the type in which the housing of the camera is so constructed that the film casette may be attached to the outside thereof in operative relation to the camera mechanism.

It is of great practical importance in the art of narrow film cameras that they be so designed that all space be fully utilized and the weight cut down as much as possible, particularly in view of the fact that such cameras are usually provided with many technical submechanisms. These cameras are usually operated without any fixed support so that any saving in weight or space is of great advantage.

The object of the invention therefore is to provide a camera in which the housing is provided with a recess behind the objective and a film casette is adapted to be positioned in said recess, the camera and the film casette having co-operating locking means for securing the casette in photographing position.

The invention is embodied in a film camera in which the film is operated in known manner by means of a film feeder or film operating pawl which is adapted to engage the perforations in the film to feed it stepwise past the objective. The film feeder is actuated by any suitable known mechanism which is located within the camera and projects from the camera housing. The casette is provided with a chamber and the parts are so arranged that when the casette is attached, the film feeder extends into the said chamber in which the feeder operates to actuate the film. This arrangement of the feeder behind the film but inside the casette possesses the advantage that the film need not be passed outside the casette but is operated wholly within the casette past a film window provided therein.

Another object of the invention is the provision of means for operating the film feeder out of engagement with the film when the casette is attached or removed. Preferably such means are embodied in a suitable slide which also serves to lock the casette to the camera.

With the above and other objects in view the invention is embodied in a film camera and casette therefor arranged and constructed as hereinafter described and as illustrated in the accompanying drawing in which Fig. 1 is a vertical sectional view of the camera and casette taken on the line 1—1 of Figure 2.

Figure 1:
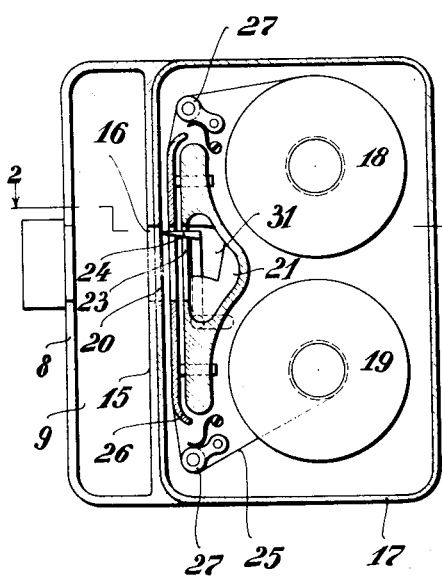

Referring to Figures 1 to 4 the camera is contained within a casing comprising the front wall 8, the right side wall 9, the left side wall 10, 11, a back 12, and a top and bottom 13 and 14. The left side wall portion 11 is offset inwardly from the portion 10, there being a narrow intermediary connecting wall 15 which is parallel to the front and the back of the camera casing and which has a film window 16. The film casette is designated 17 and is dimensioned to fit in the recess or inwardly formed corner which is bordered by the two walls 11 and 15 of the camera. The casette contains the film spools 18 and 19 and the space occupied by the film is closed light-tight except for the film window 20. Within the casette there is provided a feeder chamber 21 which is open at 22 towards the camera and which has an opening 23 through which the film feeder may engage the film 25. The latter is fed from one spool to the other and preferably runs past a yielding film guide 26 and there may be spring actuated film guide members 27, 27. The camera casing preferably has a narrow projecting edge 28 and the casette may have an edge fitting into a groove 29 in the casing for better protection against the light as is obvious, Fig. 2.

Figure 4:
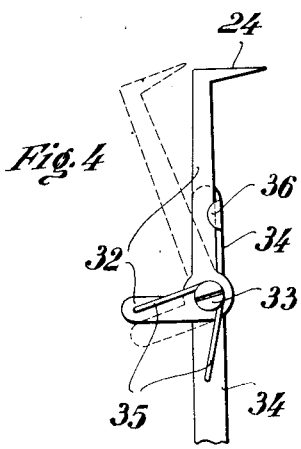
Fig. 4 is a detail view of the film feeder.

The film feeder 24 is actuated by any usual mechanism not shown in detail but generally indicated at 30. The feeder extends into the casette chamber 21 through an opening 31 in the camera wall 11 and means are provided for detaching the feeder from the film when the casette is detached. As seen in Figure 4 the feeder hook 24 is at the upper end of a bell crank 32 which is pivoted at 33 to the feeder operating lever 34. A spring 35 maintains the feeder in upright operative position as will be understood, the spring keeping the upper arm of the bell crank 32 against a lug 36 on the lever so that the parts 32 and 34 function as one piece. The casette is attached to the camera by means of a slide 37 mounted on the wall 11 of the camera casing and adapted to engage two headed pins 38, 38 secured to the casette and which are inserted into the casing through holes 39 in the wall 11, see Figure 2. The slide is operated by a button 40 in the back wall 12 and is formed with a hook 41 adapted to engage the bell crank 32 of the feeder.

Figure 3:
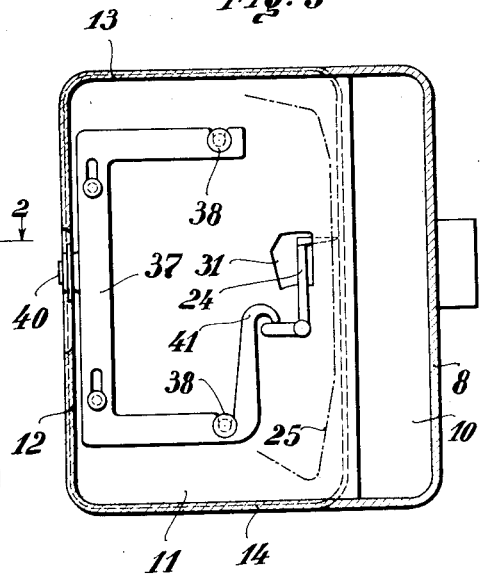
Fig. 3 is a vertical sectional view on the line 3—3 of Figure 2.
Figure 2:
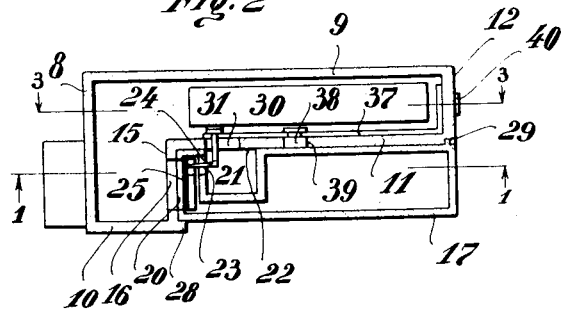
Fig. 2 is a horizontal sectional view on the line 2—2 of Figure 1.

The normal working positions of the parts are shown in Figure 3 in which positions the hook 41 does not interfere with the operations of the